Aug. 20, 1946.   W. V. THELANDER   2,406,049
AUTOMATIC CLUTCH
Filed May 3, 1944   2 Sheets-Sheet 1

Inventor
W. Vincent Thelander
Andrew F. Wintercorn
Atty

Aug. 20, 1946.　　W. V. THELANDER　　2,406,049
AUTOMATIC CLUTCH
Filed May 3, 1944　　2 Sheets-Sheet 2
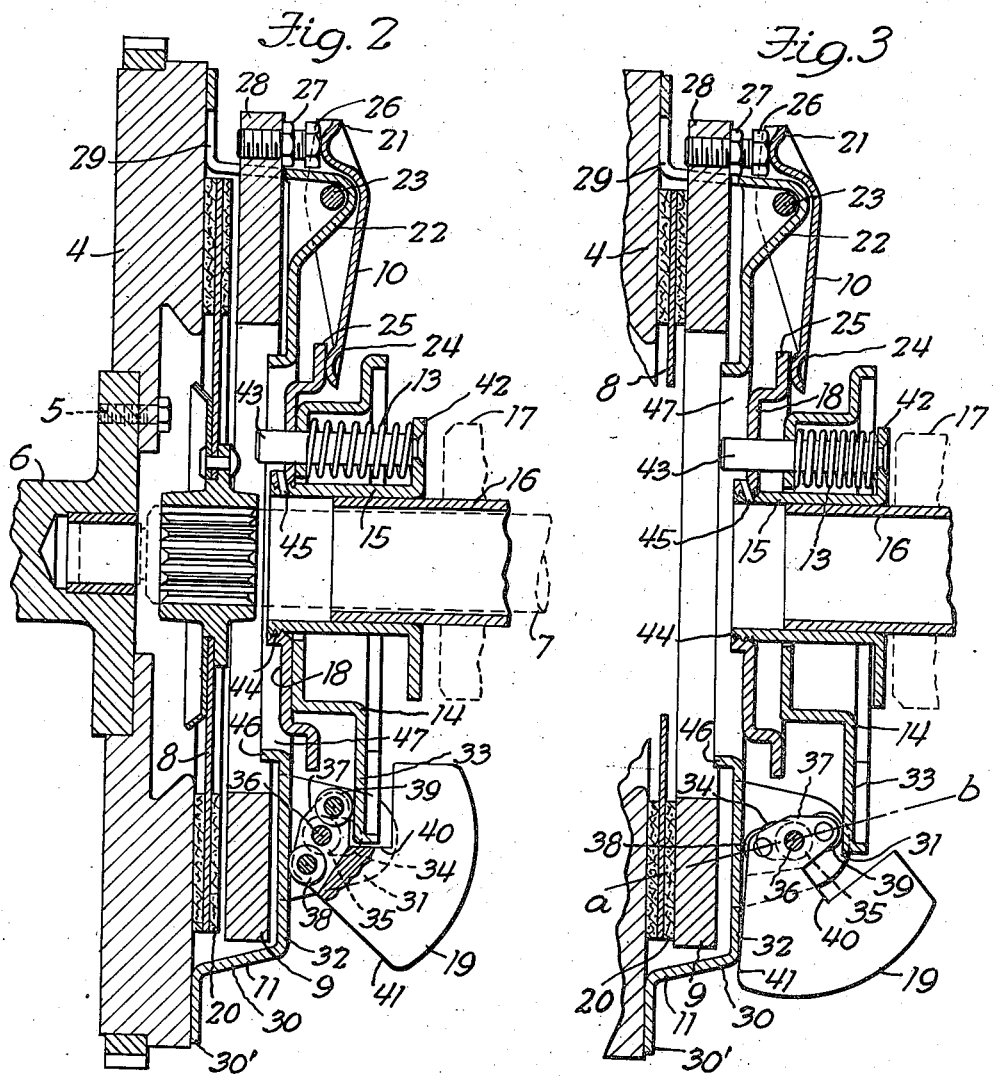
Inventor
W. Vincent Thelander
Atty.

Patented Aug. 20, 1946

2,406,049

UNITED STATES PATENT OFFICE 2,406,049

AUTOMATIC CLUTCH

W. Vincent Thelander, Auburn, Ind.

Application May 3, 1944, Serial No. 533,817

15 Claims. (Cl. 192—105)

This invention relates to automatic clutches for automotive use generally.

In Patent #1,985,301, issued December 25, 1934, in which I am a co-inventor, pressure-transmitting levers are disclosed, each cooperating with an actuating spring in a novel manner, so as to obtain pressure multiplication for positive engagement of the clutch. It is the principal object of my present invention to provide an automatic clutch utilizing pressure-transmitting levers of a somewhat similar type, to obtain pressure multiplication for a similar purpose, the present clutch, however, including a spring loading ring in combination with the pressure-transmitting levers, arranged to be moved in the spring loading direction by means of a plurality of centrifugal fly-weights.

Another object of my invention is to provide an automatic clutch of the kind mentioned, in which the centrifugal fly-weights are slidably, pivotally mounted on the back plate, which, of course, turns with the fly-wheel, the fly-weights, in swinging outwardly under centrifugal force, transmitting movement to the spring loading ring.

Another object is to provide an automatic clutch of the kind mentioned, in which the fly-weights have crosshead portions on their pivoted inner ends for transmitting movement to the spring loading ring, and the swinging movement of the fly-weights is positively limited by engagement with the back plate when the cross-head portions are still sufficiently removed from a dead-center position with respect to the spring loading ring, so that the pressure of the springs can be and is utilized in returning the fly-weights to retracted position.

Another object is to provide an automatic clutch of the kind mentioned, in which the spring loading ring has a collar supporting the same for sliding movement on the same sleeve with the throw-out collar, said supporting collar carrying the lever-actuating springs in pre-load condition, the spring loading ring being slidably guided on said supporting collar for cooperation with the fly-weights on the one hand, and with the springs on the other hand, and said supporting collar also carrying a pressure-transmitting ring for engagement with the pressure-transmitting levers.

The invention is illustrated in the accompanying drawings, in which—

Fig. 2 is a cross-section on the line 2—2 of Fig. 1, showing the clutch disengaged; and Fig. 3 is a similar, but fragmentary, section showing the clutch engaged.

The same reference numerals are applied to corresponding parts throughout these views.

Figure 1:
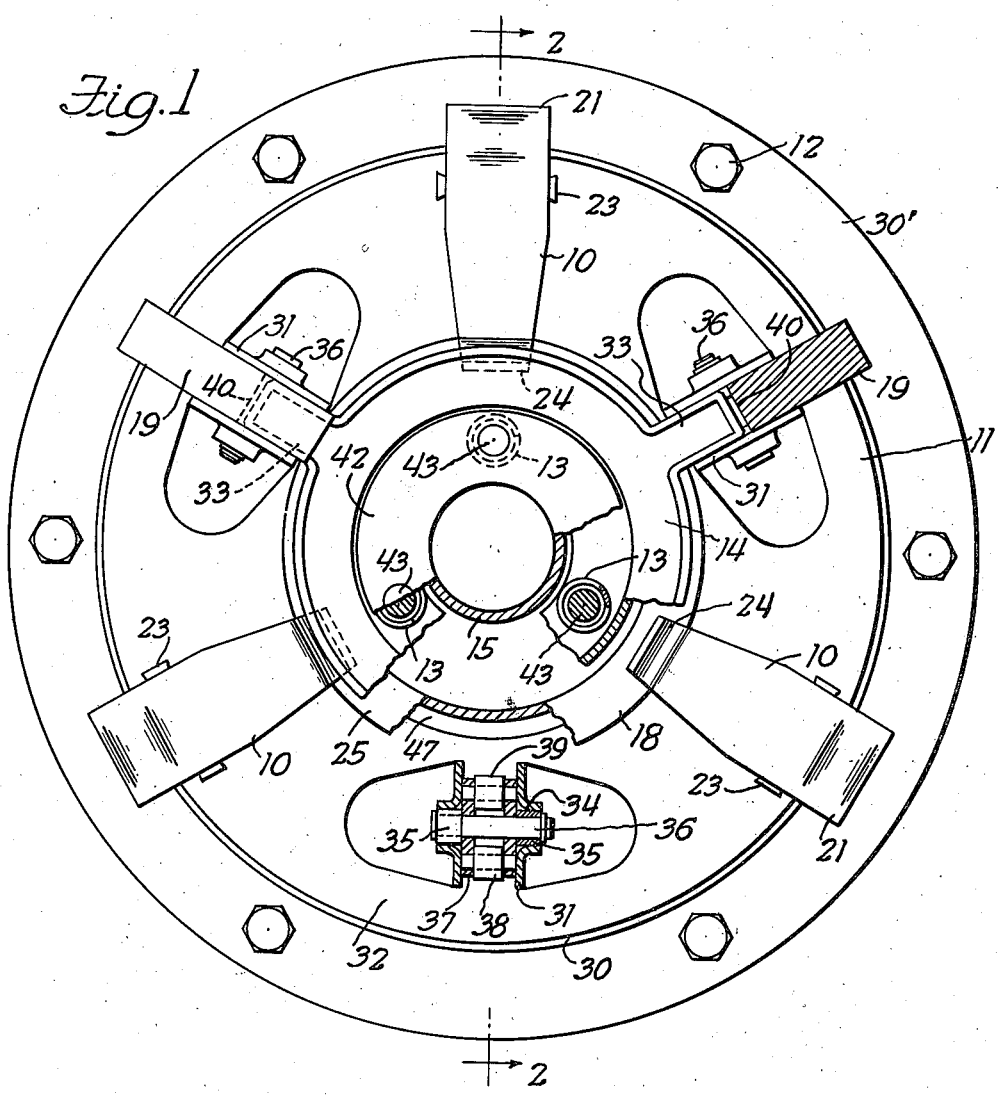
Fig. 1 is a rear view of an automatic clutch embodying my invention.

Referring first mainly to Figs. 1 and 2, the reference numeral 4 designates a fly-wheel mounted in the usual way, as indicated at 5, on the rear end of the engine crankshaft 6, whereby to constitute the driving element. A shaft, indicated at 7, constitutes the driven element and extends rearwardly into the gear box of the transmission, there being a housing about the fly-wheel and clutch assembly at the front end of the gear box, as is well known. The clutch comprises a disc 8, carried on a hub splined on the front end of the shaft 7 in the usual way, and a pressure plate 9 arranged to engage the disc 8 with the fly-wheel 4. In the ordinary, conventional, non-automatic clutch, a plurality of springs is provided, acting between the pressure plate and a back plate bolted onto the rim of the fly-wheel, normally to keep the clutch firmly engaged, and levers are provided acting between the pressure plate and the back plate to disengage the clutch against the action of the springs. In the present case, however, a plurality of pressure-transmitting levers 10 is mounted on a back plate 11 bolted, as indicated at 12, to the fly-wheel 4, and there are coiled compression springs 13 arranged to be compressed in the movement of a spring loading ring 14 between said ring and a collar 15, slidably guided on the same sleeve 16 with the throw-out collar, a portion of which is indicated at 17, the collar 15 having a pressure-transmitting ring 18 mounted thereon and movable therewith, and arranged to engage the levers 10 to urge the levers in the proper direction to apply pressure to the pressure plate 9 to frictionally engage the disc 8 between the pressure plate and the fly-wheel. In the earlier patent mentioned, the springs 13 were supported on seats provided on brackets carrying the levers 10, but in the present automatic clutch, these stationary seats are eliminated, and the spring loading ring 14 and pressure-transmitting ring 18 are provided on the collar 15, the ring 14 being arranged to be moved in the spring loading direction by the outwardly swingable, centrifugal fly-weights 19, whereby automatically to cause engagement of the clutch when the engine is speeded up to a predetermined extent above idling speed. The usual pads or facings 20 are provided on the opposite sides of the disc 8 around the margins thereof, to give the desired engagement on the back face of the fly-wheel and the front face of the pressure plate. Each of the levers 10 is pivoted near its outer end 21 on an embossed portion 22 of the back plate 11, as at 23, and has its inner end portion 24 arranged to be engaged by the flange 25 on the periphery of the ring 18. A bolt 26 is threaded in the pressure plate 9 adjacent the outer end 21 of each of the levers 10 and has the head end thereof disposed for engagement by the end of the lever, as shown, whereby pressure is transmitted to the plate 9 for the engagement of the clutch. A lock nut 27 is provided on each of these bolts, to jam against the back of the pressure plate to hold the screw in adjusted condition. These bolts 26 are received in radially projecting lugs 28, formed on the periphery of the pressure plate and projecting through slots 29 therefor in the peripheral wall 30 of the back plate. The latter, being bolted to the fly-wheel by its annular flange 30', as indicated at 12, serves to transmit drive to the pressure plate through the lugs 28, to turn the pressure plate with the fly-wheel as a unit. The slots 29 are elongated, so as to permit the lugs 28 to slide back and forth therein to the extent required in the engagement and disengagement of the clutch.

The back plate 11 is stamped from a single piece of sheet metal to the dished form shown, and has the embossed portions 22 struck therefrom in equally circumferentially spaced relation. Pairs of parallel ears 31 are also preferably punched out of the back wall 32 of the back plate at points in equally circumferentially spaced relation, midway between the bosses 22, to provide slidable, pivotal support for the fly-weights 19 and also to provide guides between these ears for the radially projecting portions 33 provided on the spring loading ring 14. The ears 31 have registering elongated slots 34 provided therein to accommodate rollers 35 that are mounted on the ends of cross-pins 36 which extend through registering holes in the middle of the forked cross-head portions 37 formed on the inner ends of the fly-weights 19. Two rollers 38 and 39 are mounted in each of the forked cross-heads 37 on opposite sides of the cross-pins 36, rollers 38 to roll on the back of the back wall 32 of the back plate, and the rollers 39 on the front of the radially projecting portions 33 of the spring loading ring, as illustrated in Figs. 2 and 3. The fly-weights are notched out on their inner side, as shown at 40, to provide operating clearance for the radially projecting portions 33 of the spring loading ring, one-half of the cross-head portion 37 on the inner ends of the fly-weights forming the one side of these notches, so that the radially projecting portions 33 of the ring 14 are disposed in direct operative relationship to the cross-heads for movement of the ring 14 automatically in response to a predetermined increase in the speed of rotation of the fly-wheel above idling speed of the engine. It is important to note in Fig. 3 that the front face 41 of the fly-weights strikes the back wall 32 of the back plate to limit outward swinging movement of the fly-weights under centrifugal force, but when the fly-weights are in that extreme position, the rollers 38 and 39 are disposed with their centers on the line a—b that is inclined at an acute angle with respect to the back wall of the back plate, the centers of the rollers 38 being spaced radially inwardly with respect to the centers of the cross-pins 36, and the centers of the rollers 39 being spaced radially outwardly with respect to the centers of the cross-pins 36. As a result, the pressure of the springs 13 can be and is utilized for returning the fly-weights 19 to the retracted position shown in Fig. 2, and to hold the same normally in that position until the engine speed is increased to a predetermined extent above idling speed. The springs 13, in other words, serve a double function: they clamp the clutch disc between the fly-wheel and pressure plate under spring pressure through the medium of the levers 10, and they also tend normally to hold the fly-weights in retracted position and to return the same to retracted position when swung outwardly under centrifugal force, even to the extreme position shown in Fig. 3.

The collar 15 has an annular flange 42 on the rear end thereof, providing seats for the springs 13. Pins 43 are riveted to and extend from the flange 42 through the springs and through registering holes provided therefor in the rings 14 and 18, whereby to provide supports for the springs and guides for the ring 14, as well as a means of holding the ring 18 against unthreading from the collar 15, the ring 18 being threaded on the collar, as indicated at 44, and being also suitably locked in place by a pin 45. The back plate 11 has an annular flange 46 defining a substantially circular, central opening 47, and the pressure-transmitting ring 18 is of substantially circular form, and small enough in radius in the reduced portion in front of the flange 25 to operate in the opening 47, as clearly appears in Fig. 2. In that way, I obtain the compactness shown, and the present automatic clutch requires little, if any, more room than the non-automatic clutch shown in the earlier patent.

In operation, it should be clear that, due to the pre-load compression of the springs 13, the levers 10 are moved in the direction of engaging the clutch in the initial outward pivotal movement of the fly-weights 19, and when the engine speed rises above the critical speed, the fly-weights move outwardly farther, and the springs 13 are accordingly compressed, causing the pressure plate 9 to hold the disc 8 engaged with the fly-wheel under a spring pressure above the pre-load pressure an extent depending upon the particular angularity of the fly-weights. The fly-weights, of course, move under restraint of the springs 13, and will not therefore assume the extreme position shown in Fig. 3 until the engine speed is sufficient for the centrifugal force to overcome the resistance of the springs to the extent indicated. It will therefore be apparent that in the normal acceleration of the engine, as between the shifting of gears, the springs 13 will be gradually compressed more and more up to the extreme condition illustrated in Fig. 3, so that the engagement of the clutch is proportionately smooth, and there is no tendency for grabbing. Assuming the clutch is engaged, as shown in Fig. 3, it should be clear that the pressure of the springs 13 is always active in the direction tending to return the fly-weights 19 to the retracted position shown in Fig. 2, due to the acute angularity of the cross-head portions 37 with respect to the back plate 11, as indicated by the line a—b, passing through the centers of the rollers 38 and 39 and through the center of the cross-pin 36 therebetween. If the operator desires to disengage the clutch manually while it is automatically held engaged, he can do so by depression of the clutch pedal so as to move the collar 15 forward against the resistance of the springs 13 by engagement of the throw-out collar 17 with the back of the flange 42. The levers 10 accordingly release pressure on the bolts 26, and the pressure plate 9 is therefore free to float away from the fly-wheel so as not to transmit drive any longer to the clutch disc 8.

It is believed the foregoing description conveys a good understanding of all of the objects and advantages of my invention. The appended claims have been drawn with a view to covering all legitimate modifications and adaptations.

I claim:

1. In a clutch comprising a driving element and a driven element, a pressure plate for holding the driving and driven elements frictionally engaged, a back plate, a plurality of levers in circumferentially spaced relation to the back plate for communicating pressure to the pressure plate under spring pressure whereby to cause engagement of the clutch, supports for said levers carried by the back plate each comprising a pivot for the lever near the outer end of the lever, a pressure transmitting ring engaging the inner ends of said levers, a plurality of springs for applying pressure to the pressure plate through said ring and levers, a spring loading ring operatively associated with the plurality of springs and the pressure transmitting ring, and a plurality of centrifugal fly-weights comprising cross-head portions slidably pivotally mounted intermediate their ends on the back plate independently of said levers, said weights being arranged in circumferentially spaced relation to the back plate intermediate the locations of said levers, said cross-heads being arranged to turn with the weights to move said loading ring in the spring loading direction when the driving element exceeds a predetermined speed of rotation.

2. In a clutch comprising a driving element and a driven element, a pressure plate for holding the driving and driven elements frictionally engaged, a back plate, a plurality of levers for communicating pressure to the pressure plate under spring pressure whereby to cause engagement of the clutch, supports for said levers carried by the back plate each comprising a pivot for the lever near the outer end of the lever, a throwout collar and a sleeve guide therefor, said throwout collar being movable manually relative to the inner ends of said levers for manual disengagement of the clutch, a spring supporting collar movable on the same guide with the throwout collar and carrying a pressure transmitting ring arranged to engage the inner ends of said levers to apply pressure to the pressure plate to engage the clutch, a plurality of springs carried on said spring supporting collar for applying pressure to the pressure plate through said ring and levers, a spring loading ring slidable on said spring supporting collar to load said springs, and a plurality of centrifugal fly-weights pivoted on the back plate independently of said levers and arranged to move said loading ring in the spring loading direction when the driving element exceeds a predetermined speed of rotation.

3. In a clutch comprising a driving element and a driven element, a pressure plate for holding the driving and driven elements frictionally engaged, a back plate, a plurality of levers in circumferentially spaced relation to the back plate for communicating pressure to the pressure plate under spring pressure whereby to cause engagement of the clutch supports for said levers carried by the back plate each comprising a pivot for the lever near the outer end of the lever, a pressure transmitting ring engaging the inner ends of said levers, a single set of springs for applying pressure to the pressure plate through said ring and levers, a spring loading ring operatively associated with said springs and the pressure transmitting ring, and a plurality of centrifugal fly-weights comprising cross-head portions slidably pivotally mounted intermediate their ends on the back plate independently of said levers, said weights being arranged in circumferentially spaced relation to the back plate intermediate the location of said levers, said cross-heads being arranged to turn with the weights to move said loading ring in the spring loading direction when the driving element exceeds a predetermined speed of rotation, said weights being movable through a predetermined limited distance under centrifugal force and said cross-heads in extreme position being so arranged relative to said spring loading ring that the pressure of said springs tends to return said weights to retracted position.

4. In a clutch comprising a driving element and a driven element, a pressure plate for holding the driving and driven elements frictionally engaged, a back plate, a plurality of levers for communicating pressure to the pressure plate under spring pressure whereby to cause engagement of the clutch, supports for said levers carried by the back plate each comprising a pivot for the lever near the outer end of the lever, a throwout collar and a sleeve guide therefor, said throwout collar being movable manually relative to the inner ends of said levers for manual disengagement of the clutch, a spring supporting collar movable on the same guide with the throwout collar and carrying a pressure transmitting ring arranged to engage the inner ends of said levers to apply pressure to the pressure plate to engage the clutch, a single set of springs carried on said spring supporting collar for applying pressure to the pressure plate through said ring and levers, a spring loading ring slidable on said spring supporting collar to load said springs, and a plurality of centrifugal fly-weights pivoted on the back plate independently of said levers and arranged to move said loading ring in the spring loading direction when the driving element exceeds a predetermined speed of rotation, said weights being movable through a predetermined limited distance under centrifugal force and when in extreme position being so arranged relative to said spring loading ring that the pressure of said springs tends to return said weights to retracted position.

5. In a clutch actuating mechanism for a lever controlled clutch mechanism the combination with the levers and a throwout means for manually disengaging the clutch, of a pressure transmitting element adapted to engage, move, and transmit pressure to the levers to engage the clutch, spring means adapted to apply pressure to said levers through said element for resilient engagement of the clutch, a spring loading element operatively associated with said spring means and adapted to be moved in spring loading direction by a speed responsive means operable in response to the speed of rotation of the clutch mechanism, said pressure transmitting element being movable against the action of said spring means by the throwout means for manual disengagement of the clutch when automatically engaged, including a guide for the throwout means, and a spring caging collar slidable on said guide and operable by said throwout means, said collar being fixed to said pressure transmitting element whereby to move the same to retracted position, and said collar having said spring loading element slidably mounted thereon and having said spring means supported thereon for loading by said element.

6. In a clutch actuating mechanism for a lever controlled clutch mechanism the combination with the levers and a throwout means for manually disengaging the clutch, of a pressure transmitting element adapted to engage, move, and transmit pressure to the levers to engage the clutch, spring means adapted to apply pressure to said levers through said element for resilient engagement of the clutch, a spring loading element operatively associated with said spring means and adapted to be moved in spring loading direction by a speed responsive means operable in response to the speed of rotation of the clutch mechanism, said pressure transmitting element being movable against the action of said spring means by the throwout means for manual disengagement of the clutch when automatically engaged, a guide for the throwout means, and a spring caging collar slidable on said guide and operable by said throwout means, said collar being fixed to said pressure transmitting element whereby to move the same to retracted position, and pins carried on said collar for support of said spring means and for slidably guiding said spring loading element in its movement relative to said collar and spring means.

7. In a clutch comprising a driving element and a driven element, a pressure plate for holding the driving and driven elements frictionally engaged, a back plate, a plurality of levers for communicating pressure to the pressure plate under spring pressure whereby to cause engagement of the clutch, supports for said levers carried by the back plate each comprising a pivot for the lever near the outer end of the lever, a pressure transmitting ring engaging the inner ends of said levers, a plurality of springs for applying pressure to the pressure plate through said ring and levers, a spring loading ring operatively associated with the plurality of springs and the pressure transmitting ring, forked projections on the back plate slidably receiving therebetween peripheral portions of said spring loading ring for movement toward and away from the back plate, and centrifugal fly-weights having pivotal cross-head portions slidably pivotally mounted in said forked projections and arranged by engagement at its opposite ends with the back plate and said peripheral portions of the spring loading ring to force the latter away from the back plate in the spring loading direction when said weights swing outwardly under centrifugal force.

8. In a clutch comprising a driving element and a driven element, a pressure plate for holding the driving and driven elements frictionally engaged, a back plate, a plurality of levers for communicating pressure to the pressure plate under spring pressure whereby to cause engagement of the clutch, supports for said levers carried by the back plate each comprising a pivot for the lever near the outer end of the lever, a pressure transmitting ring engaging the inner ends of said levers, a plurality of springs for applying pressure to the pressure plate through said ring and levers, a spring loading ring operatively associated with the plurality of springs and the pressure transmitting ring, projections on the back plate slidably guiding thereon weight actuated portions of said spring loading ring for reciprocatory movement toward and away from the back plate, and centrifugal fly-weights having cross-head portions pivotally mounted on said projections between the back plate and said weight actuated portions of said spring loading ring and arranged when said weights swing outwardly under centrifugal force to force said spring loading ring away from said back plate in spring loading direction.

9. In a clutch comprising a driving element and a driven element, a pressure plate for holding the driving and driven elements frictionally engaged, a back plate, a plurality of levers for communicating pressure to the pressure plate under spring pressure whereby to cause engagement of the clutch, supports for said levers carried by the back plate each comprising a pivot for the lever near the outer end of the lever, a pressure transmitting ring engaging the inner ends of said levers, a plurality of springs for applying pressure to the pressure plate through said ring and levers, a spring loading ring operatively associated with the plurality of springs and the pressure transmitting ring, projections on the back plate slidably guiding thereon weight actuated portions of said spring loading ring for reciprocatory movement, and centrifugal fly-weights having bellcrank shaped pivotal portions pivoted on said projections and arranged to engage said weight actuated portions of said spring loading ring whereby to move the latter in spring loading direction when said weights swing outwardly under centrifugal force.

10. In a clutch comprising a driving element and a driven element, a pressure plate for holding the driving and driven elements frictionally engaged, a back plate, a plurality of levers for communicating pressure to the pressure plate under spring pressure whereby to cause engagement of the clutch, supports for said levers carried by the back plate each comprising a pivot for the lever near the outer end of the lever, a pressure transmitting ring engaging the inner ends of said levers, a plurality of springs for applying pressure to the pressure plate through said ring and levers, a spring loading ring operatively associated with the plurality of springs and the pressure transmitting ring, forked supports for centrifugal fly-weights on the back plate, and centrifugal fly-weights having cross-head portions pivotally and slidably mounted by the middle portions of their cross-heads in said forked supports, rollers on the opposite ends of said cross-heads rollably engaging surfaces on the back plate and other surfaces on said spring loading ring whereby to move the latter in spring loading direction when said weights swing outwardly under centrifugal force.

11. In a clutch actuating mechanism for a lever controlled clutch mechanism, the combination with the levers, a back plate, and a throw-out means movable toward and away from the back plate, of a pressure transmitting element arranged to engage, move, and transmit pressure to the levers to engage the clutch, spring means for applying pressure to the pressure transmitting element, a spring loading ring operatively associated with said spring means, forked projections on the back plate slidably receiving therebetween peripheral portions of said spring loading ring for movement toward and away from the back plate, and centrifugal fly-weights having pivotal cross-head portions slidably pivotally mounted in said forked projections and arranged by engagement at its opposite ends with the back plate and said peripheral portions of the spring loading ring to force the latter away from the back plate in the spring loading direction when said weights swing outwardly under centrifugal force.

12. In a clutch actuating mechanism for a lever controlled clutch mechanism, the combination with the levers, a back plate, and a throwout means movable toward and away from the back plate, of a pressure transmitting element arranged to engage, move, and transmit pressure to the levers to engage the clutch, spring means for applying pressure to the pressure transmitting element, a spring loading ring operatively associated with said spring means, projections on the back plate slidably guiding thereon weight actuated portions of said spring loading ring for reciprocatory movement toward and away from the back plate, and centrifugal fly-weights having cross-head portions pivotally mounted on said projections between the back plate and said weight actuated portions of said spring loading ring and arranged when said weights swing outwardly under centrifugal force to force said spring loading ring away from said back plate in spring loading direction.

13. In a clutch actuating mechanism for a lever controlled clutch mechanism, the combination with the levers, a back plate, and a throwout means movable toward and away from the back plate, of a pressure transmitting element arranged to engage, move, and transmit pressure to the levers to engage the clutch, spring means for applying pressure to the pressure transmitting element, a spring loading ring operatively associated with said spring means, projections on the back plate slidably guiding thereon weight actuated portions of said spring loading ring for reciprocatory movement, and centrifugal fly-weights having bell-crank shaped pivotal portions pivoted on said projections and arranged to engage said weight actuated portions of said spring loading ring whereby to move the latter in spring loading direction when said weights swing outwardly under centrifugal force.

14. In a clutch actuating mechanism for a lever controlled clutch mechanism, the combination with the levers, a back plate, and a throwout means movable toward and away from the back plate, of a pressure transmitting element arranged to engage, move, and transmit pressure to the levers to engage the clutch, spring means for applying pressure to the pressure transmitting element, a spring loading ring operatively associated with said spring means, forked supports for centrifugal fly-weights on the back plate, and centrifugal fly-weights having cross-head portions pivotally and slidably mounted by the middle portions of their cross-heads in said forked supports, rollers on the opposite ends of the cross-heads rollably engaging surfaces on the back plate and other surfaces on said spring loading ring whereby to move the latter in spring loading direction when said weights swing outwardly under centrifugal force.

15. In a clutch actuating mechanism for a lever controlled clutch mechanism, the combination with the levers, a back plate, and a throwout means movable toward and away from the back plate, of a pressure transmitting element arranged to engage, move, and transmit pressure to the levers to engage the clutch, spring means for applying pressure to the pressure transmitting element, a spring loading ring operatively associated with said spring means, forked supports for centrifugal flyweights on the back plate slidably guiding therebetween peripheral portions of said spring loading ring for movement toward and away from the back plate, and centrifugal flyweights having cross-head portions pivotally and slidably mounted by the middle portions of their cross-heads in said forked supports, rollers on the opposite ends of said cross-heads rollably engaging surfaces on the back plate and other surfaces on the peripheral portions of said spring loading ring, whereby to move the latter in spring loading direction when said weights swing outwardly under centrifugal force.

W. VINCENT THELANDER.